UNITED STATES PATENT OFFICE.

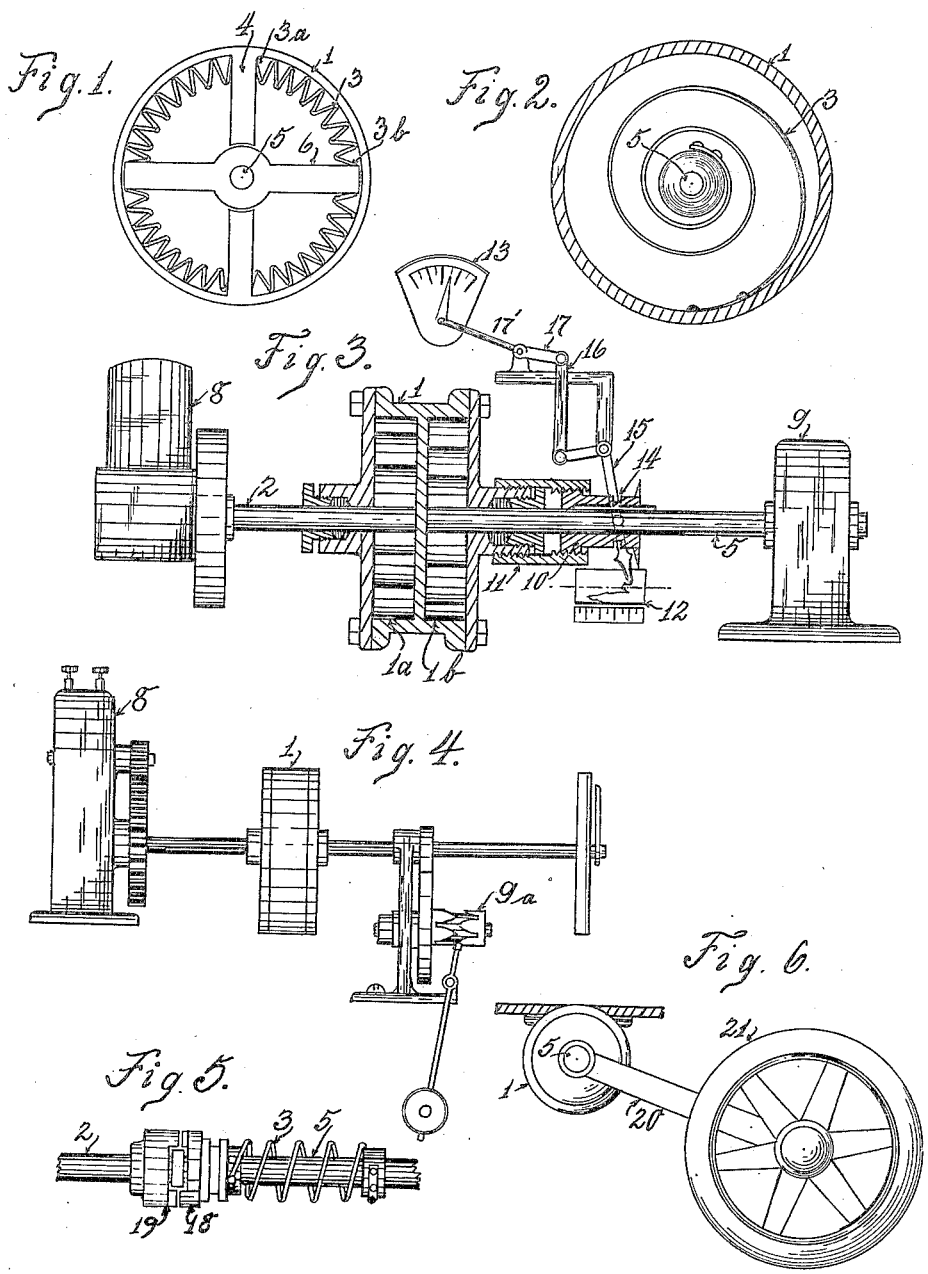

AUGUST J. KLONECK, OF NEW YORK, N. Y.

SHOCK-ABSORBER AND DYNAMOMETER FOR POWER TRANSMISSIONS.

1,346,546.   Specification of Letters Patent.   Patented July 13, 1920.

Application filed December 29, 1915. Serial No. 69,227.

*To all whom it may concern:*

Be it known that I, AUGUST J. KLONECK, a citizen of the German Empire, and a resident of New York, in the county of New York and State of New York, have invented certain new and useful Improvements in Shock - Absorbers and Dynamometers for Power Transmissions, of which the following is a specification.

This invention relates to shock absorbers and cushion gears for vibrating motors, clockwork and further to dynamometers for ascertaining a consuming horse power and to vehicle springs.

One object of this invention is to provide means for cushioning the vibration of automobiles, boats and other mechanism, having vibrating motors.

Another object of the invention is to provide the apparatus with suitable mechanism to indicate a consumed horse power.

Still another object of the invention is to provide a cushion for intermittently operated watch movements, to permit an operation of the same with continuously running motors.

A further object of the invention is to provide a coupling between two transmission shafts through suitable springs and a chamber, in which a suitable fluid is compressed for damping a reaction of the springs.

The application of this invention is almost universal, as it may also be used as a substitute for vehicle springs and other apparatus, not specified.

With the above and other objects in view, I have invented the device illustrated in the accompanying drawings in which:

Figure 1 is an elevational view of my improved device. Fig. 2 is a modified form of my device. Fig. 3 is a diagrammatic view, showing the device as applied as a cushion between a motor and a power consuming device and for indicating the horse power, parts being shown in section. Fig. 4 is a diagrammatic view, showing the device inserted between a continuously running motor and an intermittently operated device. Fig. 5 shows another form of the device. Fig. 6 is an elevational view, showing the device applied as a spring and shock absorber for vehicles.

Like reference characters indicate like parts throughout the specification and in the drawings.

In Fig. 1, the numeral 1 represents a casing, forming a connecting link of a power transmission by a shaft 2 or otherwise. A spring 3 is with one end $3^a$ connected with the casing 1, either through a projecting portion 4, or in any other suitable manner. The other end $3^b$ of spring 3 transmits a tension of the same to a shaft 5, by means of a lever 6. Said lever 6 may be made to form a piston within the chamber $1^b$ of the casing, which with the projecting portion 4 of the casing 1 may form a varying chamber for compressing a suitable fluid between each other. Said pressure upon a suitable fluid, such as oil or grease causes a damping of an action by the springs and thus rendering the device more serviceable. An escape of the compressed fluid from one chamber into another is hereby permissible. It will be observed that a turning movement of either shafts 2 or 5 will cause a compression of the springs 3 proportional to an exerted force, thus, the device may be used as well as a shock absorber as a power measuring instrument, as convenient or desired.

In Fig. 2, the numeral 3 represents a modified form of a spring, one end of which is connected to the casing 1, and the other end to a shaft 5. Any number of springs 3, may be arranged within one or more suitable casings, if desired.

In Fig. 3, the numeral 8 represents a motor, and 9 a device operated by the motor. The power transmission shafting is interrupted at 1, whereby the shock absorber is inserted for cushioning an unequal movement of one of the mechanisms. This shock absorber consists of the elements as already described in one or more casings $1^a$ and $1^b$; an additional service of this device is obtained by utilizing the varying compression of the springs to indicate or record said varying tension of the springs, which corresponds to the power transmitted to the operated mechanism. In the preferred form of my invention, I transform the rotating motion of the device to a sliding movement, by means of a worm threaded collar 10, movably keyed on shaft 5 and an inwardly threaded bushing 11, fixedly secured to the casing 1. Said collar 10 may indicate a varying tension of the springs on a scale or recording roll 12. However, a movement of the collar may be transmitted to a distant point and thus read on a dial 13. Such transmission of the power indication may be as convenient or desired, as for instance, by a recess 14 in said collar 10 which meshes with a lever 15. The latter actuates other links and levers 16 and 17, and by meter shaft 17' will operate said dial 13 at any distant point, as illustrated.

In Fig. 4, the numeral 8 represents a continuously rotating motor and 9, a reciprocating, a pendulum or clock work mechanism. It will be seen that this device may form an ideal coupling for electrically driven clocks or watches, having a continuously running motor and an intermittently operated pendulum or other movement.

In Fig. 5, the numerals 2 and 5 represent two transmission shafts, which are connected together by a spring 3. One end $3^a$ of spring 3 is rigidly secured to shaft 2. The other end $3^b$ of the spring is secured to the other shaft 5, or to a clutch part 18, which engages with the clutch portion 19 on shaft 5.

In Fig. 6, the casing 1 is shown as fixedly secured to the frame of a vehicle, (not illustrated) while shaft 5 is connected with a lever 20, or vice versa. The latter carrying at the other end a wheel 21 of a vehicle. In the same manner may both shafts 2 and 5 be used as a differential spring cushion for vehicle wheels, whereby the shafts are movably mounted in suitable bearings on the frame of a vehicle.

Having fully described my invention that what I claim as new and desire to procure by Letters Patent is:

1. A device of the character described comprising a casing having circular chambers at each side thereof, a revoluble part in each chamber adapted to be operated by shafts, leading into each chamber and springs arranged operatively between said casing and said revoluble parts within said chambers.

2. A device of the character described comprising a housing having chambers at each side thereof, revoluble members arranged within said chambers and springs, flexibly connecting said housing and said members, said chambers having openings for admitting driving shafts to said members, a spring tension meter for said springs and means for operating the meter.

3. A device of the character described consisting of rotatable members and springs, the latter connecting said members, independent means, whereby a varying tension of said springs will be ascertained, said means comprising a threaded sleeve operated by one of said members and a sliding part, having a threaded portion coacting therewith arranged upon said second member, said sliding part having a knife shaped flange, and a scale, said slidable part being adapted to indicate a varying tension of said springs upon said scale.

4. A device of the character described consisting of revoluble members and a spring, the latter connecting said members, a tension meter for said spring arranged at a distant position independently of said device, a shaft for connecting said meter and said device by a lever secured to said shaft, said lever being operated by a slidable part of one of said members, and levers, said sliding part being operated by said other member by a varying tension of said spring.

5. A device of the character described consisting of revoluble members and springs, the latter connecting said members, a tension meter for said springs and means for operating the same, said means comprising a slidable part upon one of said members and operated by another member by a varying tension of said springs, by means of a worm threaded portion thereof, levers, coöperating with said slidable part and turning a meter shaft and by the latter operating a tension indicator.

6. The combination, a device consisting of a driving member, driven member and a spring, the latter serving as a flexible connection between said members, shafts, extending from said driving and driven members, driving means and driven means connected therewith, power indicating means and means for operating the same, connecting linkage between said members consisting of worm threaded parts, one of which is slidably keyed upon the shaft of one of said members and operating levers and links, and a turnable link operated by one of said levers and operating one power indicator.

7. A device of the character described consisting of a plurality of rotatable members and springs, the latter serving for connection between said members, a driving means and a driven means connected therewith, said members and springs being arranged between said driving and driven means, one of said members inclosing two other members, said driving means being an unequal rotation producing motor.

8. A device of the character described consisting of a plurality of rotatable members and springs, the latter being adapted to connect said members, a driving means connected with said members, a meter for varying tensions of one of said springs and means for operating and connecting said meter to said members and springs, one of said members inclosing other members and springs, said driving means being an unequal rotation producing motor.

9. A device of the character described consisting of two members and a spring for connecting said members, one of said members housing the other member and said spring, said second member being adapted to form a piston for compressing a fluid within said first mentioned member.

10. A device of the character described consisting of two members and a spring for connecting said members, one of said members forming chambers and housing the other member and said spring, means whereby a varying tension of said spring will be indicated and recorded, said second member being adapted to form a piston within said first named member for compressing a fluid, serving to dampen a movement of said piston member.

11. A device of the character described consisting of revoluble members and springs, a housing serving to connect said members through said springs and inclosing two of said members and springs, a driving means connected with said members and means, whereby a varied tension of said springs will be ascertained.

12. A device of the character described consisting of revoluble members and springs, a casing serving to connect said members through said springs and inclosing two of said members and springs, and a driven means connected with said members, said springs being inclosed in said casing.

13. A device of the character described consisting of revoluble members and springs, a housing serving to connect said members through said springs and inclosing two of said members and springs, a driven means connected with said members, and means, whereby a variable tension of said springs will be ascertained, said springs being inclosed in said housing.

14. A device of the character described consisting of revoluble members, springs and a casing, said casing inclosing said members at each side, a driving means and driven means connected to said members respectively, said springs being inclosed in said casing, adapted to connect said members.

15. A device of the character described consisting of a casing, revoluble members and springs, the latter connecting said members by means of said casing, said casing inclosing two of said members and springs, a driving means and driven means connected with said members and springs, and means, whereby a varied tension of said springs will be recorded.

16. A device of the character described consisting of a casing, revoluble members and springs for connecting the same through said casing, said casing inclosing said members within each side thereof, and a driving means connected to one of said members and through said springs operating the other members.

17. A device of the character described consisting of a casing, revoluble members and springs, connecting one another through said casing, said casing inclosing one of said members within each side, a driving means connected with said members and said springs, and means, whereby a varied tension of said springs being indicated and recorded.

18. A device of the character described consisting of revoluble members and springs for connecting the same, one of said members forming chambers for housing the other members and said springs, and a fluid, said second named members being adapted to operate in said fluid.

19. A device of the character described consisting of revoluble members and springs for connecting the same, one of said members forming chambers for said other members, said springs and a fluid, the fluid being adapted to dampen a movement of said other members, and a driving means, connected with one of said members.

20. A device of the character described consisting of revoluble members and springs for connecting the same, one of said members forming chambers for housing the other members, said springs and a fluid, said fluid being adapted to dampen a movement of said other members, and a driven means connected with one of said members.

21. A device of the character described consisting of revoluble members and springs for connecting the same, a housing formed by one of said members for two other members and for said springs, and a suitable fluid for said housing, the movement of said members being dampened by said fluid, and a lever, connected with one of said members.

22. In a device for flexibly connecting transmission shafts, revoluble members arrangeable at the junction of the transmission shafts, and springs flexibly connecting said members, independent means for indicating and recording varying tensions of said springs according to the power exerting said springs, and means for operating the same comprising an inwardly threaded sleeve attached to one member, an outwardly threaded part slidably arranged upon another member coöperating therewith, levers and a meter shaft operated by said last part, said meter shaft actuating the indicating means.

23. In a device for flexibly connecting transmission shafts, revoluble members arrangeable at the junction of the transmission shafts, and springs for flexibly connecting said members, means, located at a distant point therefrom adapted for showing the degree of tension of said springs for indicating the power tensioning said springs, and means for operating the indicating means comprising a movable part upon one member operatable by the differential position of another member, and an indicator shaft operated therewith.

In testimony whereof I hereunto subscribe my name to this specification.

AUGUST J. KLONECK.

Witnesses:
MARTIN POPPELAUER,
NORBERT LANDAU.